United States Patent [19]
Lamelot

[11] 4,151,968
[45] May 1, 1979

[54] NIGHT GUIDING DEVICE FOR SELF-PROPELLED MISSILES
[75] Inventor: Pierre M. L. Lamelot, Ville D'Avray, France
[73] Assignee: Societe Anonyme de Telecommunications, France
[21] Appl. No.: 745,225
[22] Filed: Nov. 26, 1976
[30] Foreign Application Priority Data
 Dec. 1, 1975 [FR] France .................. 75 36722
 Jun. 25, 1976 [FR] France .................. 76 19495
 Jul. 12, 1976 [FR] France .................. 76 21338
[51] Int. Cl.² ............................................. F41G 7/00
[52] U.S. Cl. ................................................ 244/3.16
[58] Field of Search ............... 244/3.16, 3.13, 3.11; 250/338, 342

[56] References Cited
U.S. PATENT DOCUMENTS
3,796,396  3/1974  Crovella ...................... 244/3.13
3,974,383  8/1976  Chapman ...................... 250/342
3,992,629  11/1976  Chapman ...................... 244/3.16

Primary Examiner—Samuel Feinberg
Attorney, Agent, or Firm—Jacobs & Jacobs

[57] ABSTRACT

A night guiding device for self-propelled missiles, comprising a daylight sighting telescope and an infrared goniometer, the unit being called a localizing apparatus, for detecting an infrared missile-borne source, or tracer, a night sighting thermal telescope, a visualization device associated therewith, further comprising a computer arranged for receiving through storing, amplifying and processing means, on the one hand signals transmitted by the localizing apparatus and characteristic of the missile position in relation to the optical axis of said localizing apparatus, and on the other hand signals supplied by the thermal telescope and characteristic of the missile position in relation to the optical axis of said thermal telescope, said computer supplying to said visualization device, signal representative of the difference between the signals received respectively from the localizing apparatus and the thermal telescope.

20 Claims, 16 Drawing Figures

NIGHT GUIDING DEVICE FOR SELF-PROPELLED MISSILES

The present invention relates to the night guidance of missiles, more particularly self-propelled missiles guided from a remote-control station towards a mobile or stationary target.

Daylight guidance of such missiles is well known. It is an indirect guidance achieved by alignment on an axis optically defined by the reticle of a sighting telescope having its crossing point maintained by the observer sitting in the control station in coincidence with the target. The angular deviations of the missile in relation to the optical axis thus defined are delivered to the observer by means of an infrared goniometric optical device detecting the infrared source, called "tracer", carried by the missile, the unit formed by the daylight sighting telescope and the infrared goniometer being called infrared localizing apparatus.

The daylight guiding system is designed in such manner that the distance between the optical axes of the sighting telescope and of the goniometer is small compared to the guiding accuracy desired, i.e. less than 0,1 mrd.

The goniometer optical axis forms with the lign of sight an angle which is smaller than 0,1 mrd due to an appropriate mechanical coupling and an optical adjustment made in the factory.

For using such devices by night, it is necessary to associate with the daylight guiding system a night observation system of the thermal imagery type having an optical axis also defined by the crossing point of a reticle. The guidance of the missile is achieved as soon as the thermal telescope optical axis coincides with the goniometer optical axis. Such a thermal telescope comprises for instance a linear array of infrared elementary detectors, called bar of infrared elementary detectors, associated with a mechanical scanning device along one or two rectangular axes, or also a matrix array of elementary detectors.

Yet, the mechanical assembly techniques do not ensure without adjustment the coincidence of the optical axis of such a night telescope with the goniometer optical axis; the initial adjustment could also be unstable due to the resilience of the mechanical links. The included angle between these axes represents the mechanical adjustment accuracy of such a night telescope.

The object of the invention is to reduce the observed value of this angle to zero, that is, to achieve coincidence of the optical axis of the thermal telescope with the optical axes of both the daylight sighting telescope and the goniometer to which the former is rigidly connected, the coincidence being automatically achieved after the departure of the missile.

To this effect, there is provided according to the invention a device comprising a daylight sighting telescope and an infrared goniometer, the unit being called localizing apparatus, for detecting a missile-born infrared source, and a night vision termal telescope, said device further comprising a computer receiving through storage, amplifying and processing means, on the one hand the signals provided by the localizing apparatus and characteristic of the missile position in relation to the optical axis of said localizing apparatus, and on the other hand the signals provided by the thermal telescope and characteristic of the missile position in relation to the optical axis of said thermal telescope, said computer supplying to a visualization device associated with said thermal telescope signals representative of the difference between the signals received respectively from the localizing apparatus and the thermal telescope.

With the known night vision telescopes able to supply a very contrasty image of the target and its environment, the pyrotechnical missile-borne tracer is not an infrared radiation transmitter sufficiently contrasty to be tracked with the required accuracy.

To this effect, and according to one embodiment of the invention, the thermal telescope provided with a focusing lens and a scanning device along one direction incorporates a detecting device comprising two infrared detectors, the first being responsive to the transmitting spectral range of the target and landscape and the second being responsive to the transmitting spectral range of the missile-borne tracer.

Both detectors may be formed each with a linear array of elementary detectors arranged transversely to the scanning direction, both arrays being located in the thermal telescope focus plane.

As an alternative, the first detector is a linear array of elementary detectors arranged transversely to the scanning direction, and the second detector comprises two threadlike detectors non-parallel to the scanning direction and non-parallel between themselves. Both threadlike detectors being non-parallel, the two pulses which they deliver will be separated by a time interal depending on the co-ordinate Y of the tracer image along axis Y'-Y perpendicular to the scanning direction.

Therefore, these two pulses allow in connection with reference pulses generated by the scanning device the coordinates X, Y to be determined by a very simple electronic processing.

According to a further embodiment, the detecting device comprises a single infrared detector particularly responsive to the transmitting spectral range of the target and landscape, and sufficiently responsive to the transmitting spectral range of the tracer to track it, a first optical filter defining a wide wave-length band for detecting the target and landscape, a second optical filter defining a very narrow band for detecting the tracer, and a selection member for placing either the first filter or the second filter on the telescope optical axis.

When it is desired to track the missile, the aforesaid selection device is tilted, said device being for instance a disc eccentric in relation to the telescope optical axis and provided with two openings accommodating the filters, in the position where the second filter is on the telescope optical axis. A well contrasty image of the tracer is thus obtained since in the very narrow band defined by the second filter, the energy radiated by the target and landscape is negligible while the transmitted fraction of the tracer radiation is sufficient to allow detection.

The invention will become more apparent from the following description made in reference to the accompanying drawing wherein.

Figure 1:
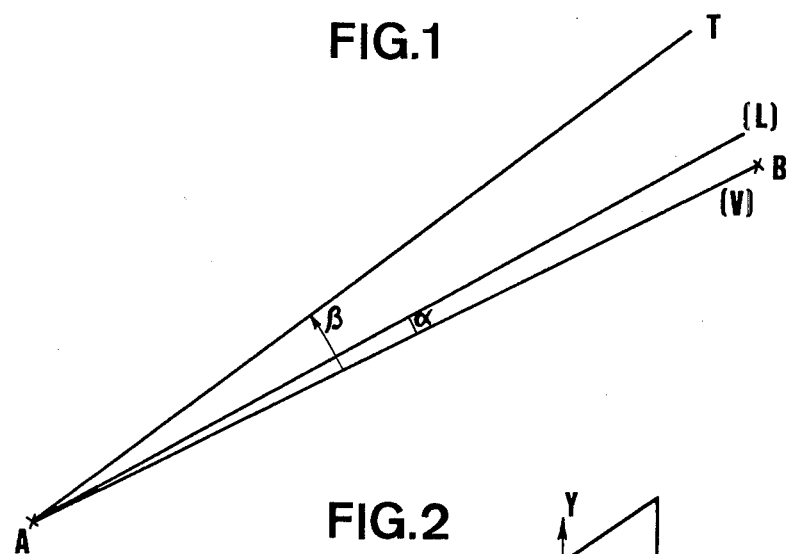
FIG. 1 shows the relative positions of the optical axes of the three view-finders available to the observer.

As seen in FIG. 1, the observer A aims at a target B with the daylight sighting telescope. The optical axis AL of the goniometer forms with the line of sight an angle $\alpha$ smaller than 0,1 mrd, due to a suitable mechanical coupling and an optical adjustment made in the factory. AT is the thermal telescope optical axis which is, according to the invention, associated with the daylight guiding system. Angle $\beta$ represents the mechanical adjustment accuracy in assembling the telescope.

Figure 2:
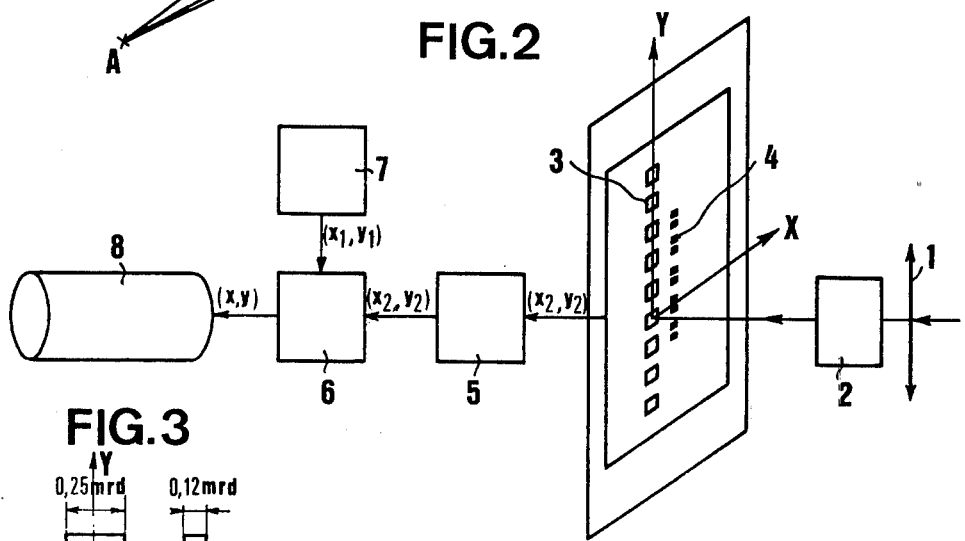
FIG. 2 is a block-diagram of the thermal telescope according to the invention provided with a detecting device of a first type.
Figure 5:
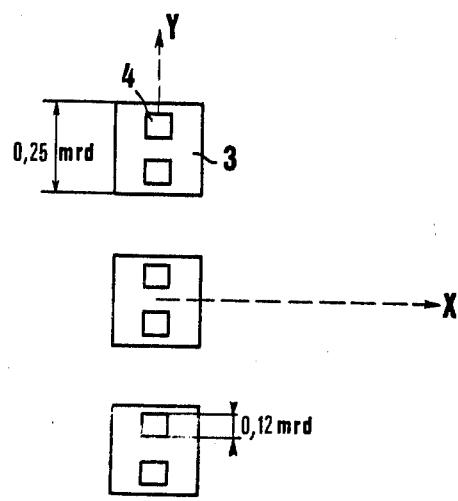
FIGS. 5 and 6 show alternative embodiments of the detectors of FIG. 2.
Figure 6:
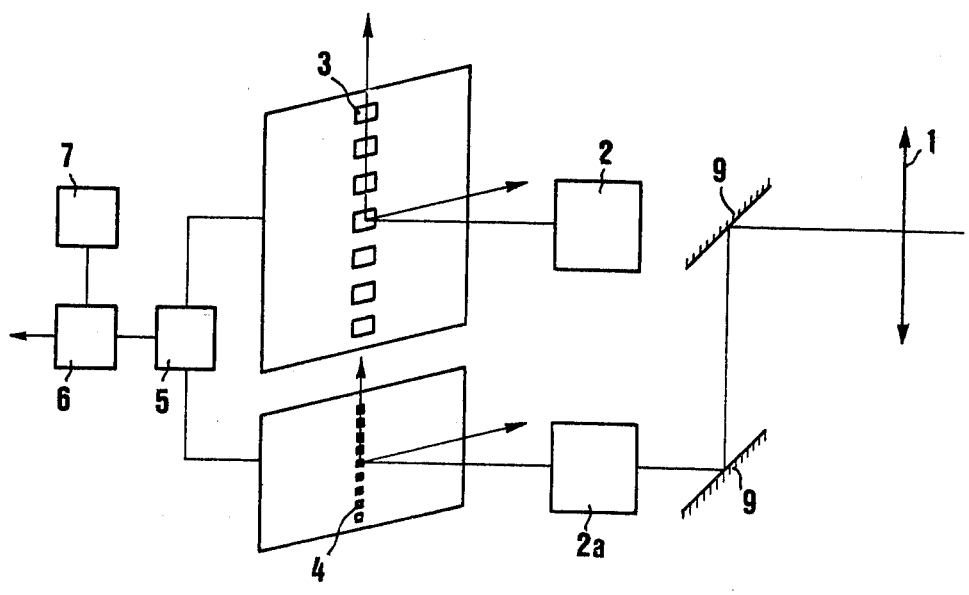

As seen in FIG. 2, a bar of elementary detectors, for instance of $Cd_xHG_{1-x}Te$, whose sensitivity is centered on the spectral area $3\mu$ to $5\mu$, or $8\mu$ to $12\mu$ is placed in the focal plane of lens 1 of the thermal telescope which forms the night sighting system. The bar may be replaced by a mosaic array of elementary detectors of same sensitivity corresponding to the infrared transmitting range of a target B and its environment. According to the invention, a mosaic array 4 of detectors or also a second bar 4 of infrared detectors with sensitivity centered on wave-lengths, 1,5 to 2,5$\mu$, area in which the radiation of the missile-borne tracer B presents a maximum contrast, are placed in the same focal plane of lens 1. Both detectors 3 and 4, or arrays of detectors, may be associated in various ways as will be described later. They may be placed side by side (FIG. 3), or superimposed (FIG. 5) or displaced in the same focal plane (FIG. 6).

It should be noted that the expression "lens focal plane" is only an approximation in the case where the optics of the telescope are not achromatic, which is the case of a lens, since the focal distance varies then slightly in relation to the radiation wave-length to be detected.

Figure 7:
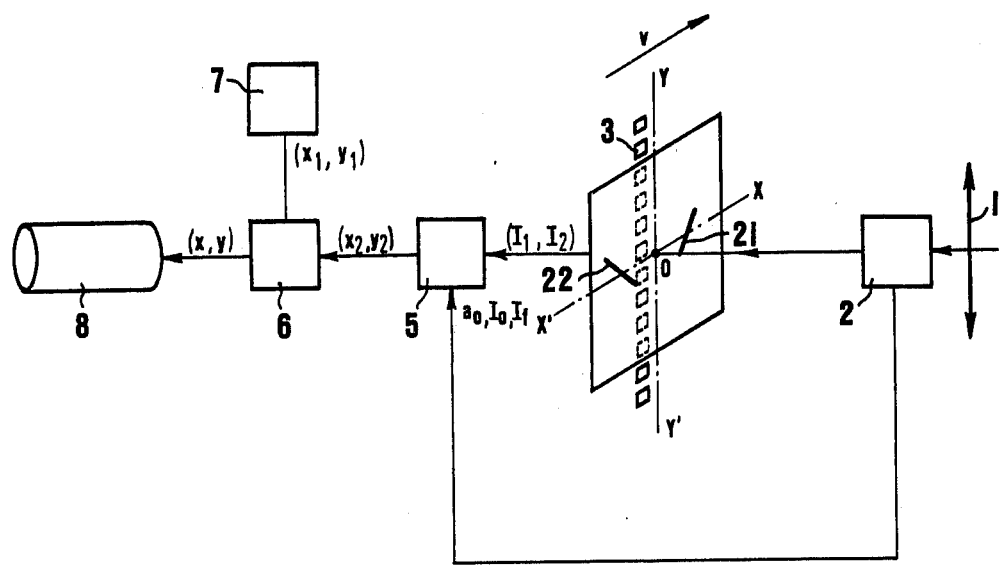
FIG. 7 shows a thermal telescope provided with a second type of detecting device.
Figure 13:
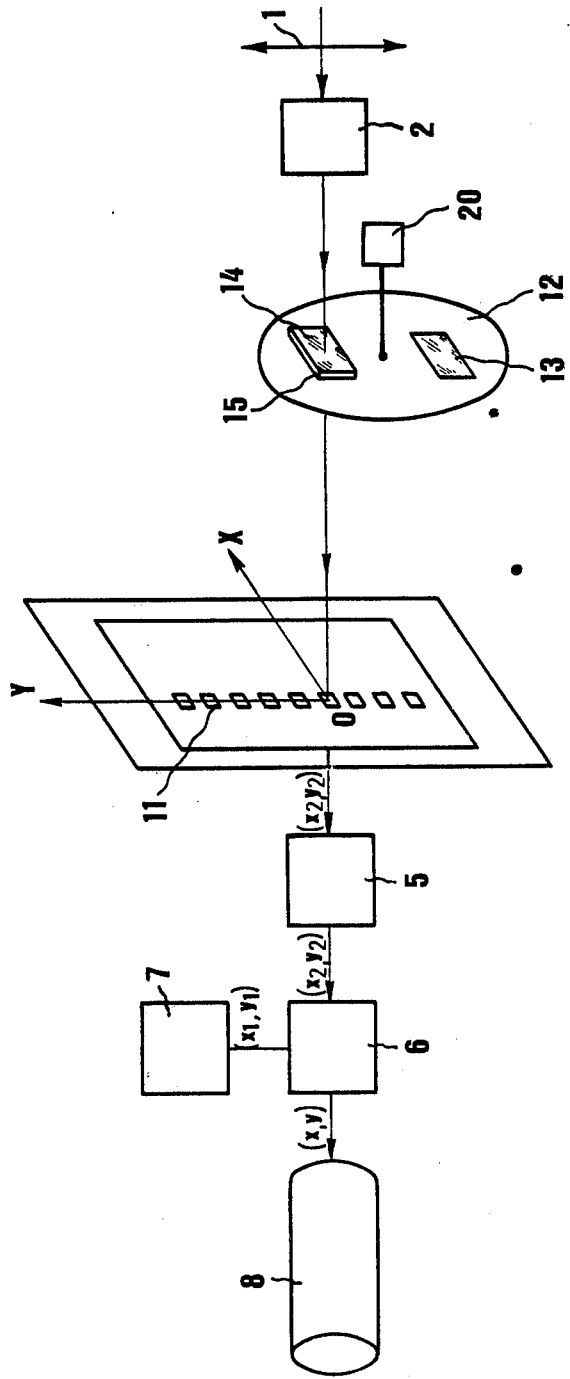
FIG. 13 shows a thermal telescope provided with a third type of detecting device.

The accuracy obtained by placing mosaic arrays 3 and 4 in the same plane is sufficient, but other embodiments of the detecting device will also be described hereafter with reference to FIGS. 7 and 13, where the achromatic aberration is compensated for.

A horizontal scanning device 2 along O'X is arranged in front of detectors 3 and 4 to scan the night field of vision in the case where detectors 3 and 4 are simple bars. The scanning device 2 can be a plane mirror to which a motor imparts an oscillating movement. It moves then about an axis parallel to the direction O'Y defined by the detecting bars. The scanning device 2 may also be formed by a straight prism rotating about an axis parallel to O'Y. Any other scanning device may supply a field of vision along direction O'X by means of the same detecting bar. The device 2 could also be placed in front of lens 1.

The sensitive face of each elementary detector of bar 3 is in form of a small square with sides measuring 0,25 mrd. If the bar is made of fifty detectors spaced apart by 0,25 mrd, the field of vision of the night sighting system is then of 25 mrd along axis O'Y. A scanning device 2 may be adapted to scan an image made of two interlaced frames of fifty lines. It is enough to read the second frame by the same column of fifty elementary detectors after having shifted the incoming beam by a suitable angle by any appropriate means. The field of vision corresponding to one detector 3 is then 25 mrd $\times$ 25 mrd.

Figure 3:
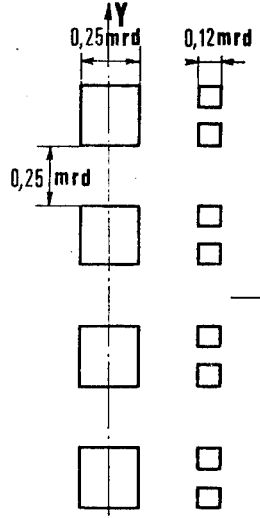
FIG. 3 is a front view of the detectors of the telescope of FIG. 2 in a first embodiment.

A bar of elementary detectors 4, sensitive to the 1,5 to 2,5$\mu$ wave-length radiation has been placed side by side in the vicinity of the center of the bar 3, on the same substrate. Angle $\beta$ of FIG. 1, i.e. the initial angular distance between the optical axes, is small enough to permit using a bar formed of only sixteen elementary detectors in form of small squares of 0,12 mrd sides placed two by two on the side of each elementary detector of the first bar 3. FIG. 3 brings precisions as to how the two bars are arranged. By means of a horizontal scanning, the detection of the missile in the center of the night field of vision is achieved while forming an image made of two interlaced frames of sixteen scanning lines in a 4 mrd area at O'Y and a 25 mrd area at O'X. The bar 4 made of sixteen elements sensitive from 1,5$\mu$ to 2,5$\mu$ delivers the angular deviations of the missile-borne tracer in the vicinity of the center of the night field of vision with a precision at X and Y of the order of 0,06 mrd, since it is possible to distinguish two elements distant of 0,12 mrd. Bar 4 may be made with detectors of for instance $Cd_xHg_{1-x}Te$, InAs or PbS.

Figure 4:
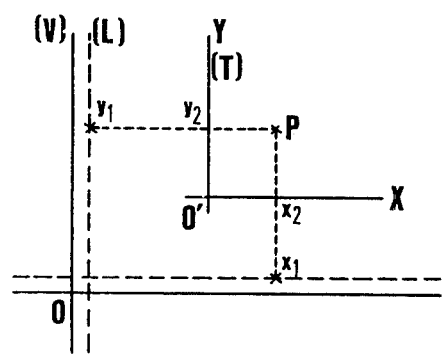
FIG. 4 shows the relative positions of the three reticles of the view-finders before coincidence of their optical axes is achieved.

FIG. 4 shows the detection of missile (P) by means of various reticles before achieving the axis coincidence procedure according to the invention.

For instance, missile P (FIG. 4) has co-ordinates $y_2$ and $x_2$ in the system (T) of axis O'Y, O'X given by the thermal telescope reticle.

Values $(x_2, y_2)$ are detected at a given moment $t_o$ subsequent to the departure of the missile, but this time is chosen brief. This time $t_o$ corresponds for instance to a distance covered by the missile of the order of 200 meters. According to FIG. 2, these values are transmitted to the electronic device 5 for storing, amplifying and processing signals, adapted to the detectors used. Finally, the values $(x_2, y_2)$ thus processed are stored for calculations in device 6 as follows:

$$x = x_2 - x_1$$

$$y = y_2 - y_1$$

where $(x_1, y_1)$ are the missile co-ordinates delivered by the goniometer and therefore measured in relation to the goniometer reticle (L) (see FIG. 4). Values $(x_1, y_1)$ have been detected at the same moment $t_o$ as values $(x_2, y_2)$ and supplied to the computer through an electronic storing, amplifying and processing device 7. Device 6 delivers thereafter the corrections $(x, y)$ to the deflection coils or plates of a cathodic tube 8 in the form of electric voltages. The night sighting axis is materialized by a reticle bound for instance to the center of the screen of the sighting cathodic tube 8, observed through an eye-piece. In relation to this reticle, a night image can be positioned by means of framing voltages applied along horizontal axis O'X and vertical axis O'Y. An almost instantaneous and automatic correction achieves coincidence of the optical axes of the localizing apparatus and the thermal telescope by applying the corrective voltages x and y to the cathodic tube 8. The correction may be made each time a missile is fired, either only once at time $t_o$, or continuously in real time during the guiding operation of the missile.

The night sighting device according to the invention is therefore able to supply the angular deviations of the missile in relation to the crossing point of a night sighting reticle with an accuracy superior to 0,1 mrd.

The embodiments shown in FIGS. 2 and 3 relate to the case where two detectors 3 and 4 are placed side by side. The moments for detecting the field and the missile are then shifted by a known time lapse due to the small distance between the two bars 3 and 4. It is also possible to superimpose detectors 3 and 4 as shown in FIG. 5, by providing a first optical window transparent to the radiation of $3\mu$ to $5\mu$, or $8\mu$ to $12\mu$ wave-lengths, said window having itself a sensitivity centered on the window of $1,5\mu$ to $2,5\mu$. Those detectors 3 and 4 analyze the same field at each moment by means of a unique concentration 1 and scanning 2 system shown in FIG. 2, both detectors being attached to the same substrate and eventually inserted in the same cryostat.

If need be, detectors 3 and 4 may also, according to FIG. 6, be inserted in two distinct cyrostats, which involves a partial separation of the optical paths, for instance by means of two mirrors 9 or one plate with parallel faces. This implies eventually using two scanning devices 2 and 2a. Processing of the signals transmitted by the detectors is made also at 5 in order to supply as previously described a measure of the angular deviations of the missile in relation to the crossing point of the night sighting reticle.

Another embodiment of the thermal telescope in particular its detection device will now be described, with reference to FIGS. 7 through 12.

In the telescope of FIG. 7, the elements corresponding to the elements already shown in FIG. 2 have the same numeral references.

Figure 8:
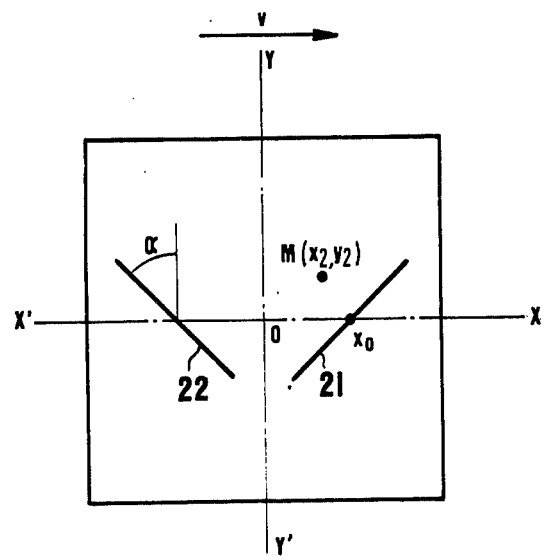
FIG. 8 shows an embodiment of the detector for tracking the missile-borne tracer.

The detection device substantially differs from that shown in FIG. 2 and comprises on the one hand a linear mosaic array of elementary detectors 3 of the same type as that of FIG. 2 and, on the other hand, two threadlike detectors 21 and 22, non-parallel, placed preferably as shown in FIG. 8, that is, inclined at an angle $\alpha = 45°$ in relation to axis Y'Y and placed symmetrically in relation to that axis, the distance between the intersection point of detector 21 or 22 with axis X'X and the origin of the reference system being called $x_o$.

As has been previously discussed, the purpose of the linear mosaic array 3 is to detect the target which the missile has to reach and also the environing landscape, and to this effect its sensitivity is maximum in the wavelength range of 8 to 12 $\mu$m. Detectors are for instance of $Cd_xHg_{1-x}Te$, the value of x being suitably chosen.

The threadlike detectors 21 and 22 for localizing the missile-borne tracer have a good sensitivity in the transmitting range of the tracer. Detectors of $Cd_xHg_{1-x}Te$ for instance are used, in front of which filters (not represented) have been placed to define a narrow wavelength band, for instance 3,8-4 $\mu$m.

As shown in FIG. 7, mosaic array 3 and detectors 21 and 22 are placed in slightly shifted planes, in order to compensate for the chromatic aberration mentionned hereabove due to the use of lenses, for instance made of germanium, for the focusing lens 1. Thus, the tracer image is focused exactly in the plane of the threadlike detectors.

Detectors 21 and 22 generate respective pulses $I_1$ and $I_2$ which are applied to the processing device 5 which will be described hereafter in two different embodiments.

Device 5 receives also reference pulses supplied by the scanning device 2 and transmits signals representative of co-ordinates $x_2$, $y_2$ of the tracer in the reference system bound to the thermal telescope.

A simple calculation will show that the co-ordinates $(x_2, y_2)$ of the tracer image can be derived from pulses $I_1$, $I_2$ generated by detectors 21 and 22.

Let us suppose that at the time origin $t_o$, the scanning device delivers a reference pulse $a_o$.

The tracer whose image in the detection plane is M $(x_2, y_2)$, is detected by detector 21 at the moment $t_1$ such as $$x_2 - (x_o + y_2 \, tg\alpha) = vt_1$$

and by detector 22 at the moment $t_2$ such as $$x_2 + (x_o + y_2 \, tg\alpha) = vt_2$$

In the present case, $\alpha = 45°$, therefore $tg\alpha = 1$ and the following equations are formed:

$$2x_2 = v(t_2 + t_1)$$

$$2y_2 = v(t_2 - t_1 - 2t_o), \text{ with } x_o = vt_o$$

The calculation of $x_2$ and $y_2$ necessitates therefore, in addition to pulses $I_1$, $I_2$ from detectors 21, 22 the reference pulse $a_o$ giving the time origin and a reference pulse $I_o$ at time $t = t_o$.

Finally, a pulse $I_f$ is necessary to define the end of a scanning period. The reference pulses $a_o$, $I_o$ and $I_f$ are supplied directly to the processing device 5 through the electronics associated with the scanning device 2. There is no difficulty in obtaining these pulses from the scanning device for one skilled in the art, and detailed explanations are not necessary.

A description will now be given, with reference to FIGS. 9 and 10, of a first embodiment of the device 5, wherein the processing is done in analog mode.

The device comprises four flip-flops 31, 32, 33, 34 to which are respectively applied pulses $a_o$, $I_1$, $I_2$, $I_o$, as well as pulse $I_f$ at the reset input. The corresponding output signals a, $b_1$, $b_2$ and $b_o$ are shown in FIG. 4.

These signals, and the conjugated signals, are applied as shown in FIG. 5 to AND gates 40, 41, 41', 42, 42', the connections between the flip-flops and the gates being symbolized by block 38.

For instance, gate 41 receives signals a and $\overline{b_1}$, gate 41' signals $\overline{a}$ and $b_1$, etc.

Figure 10:
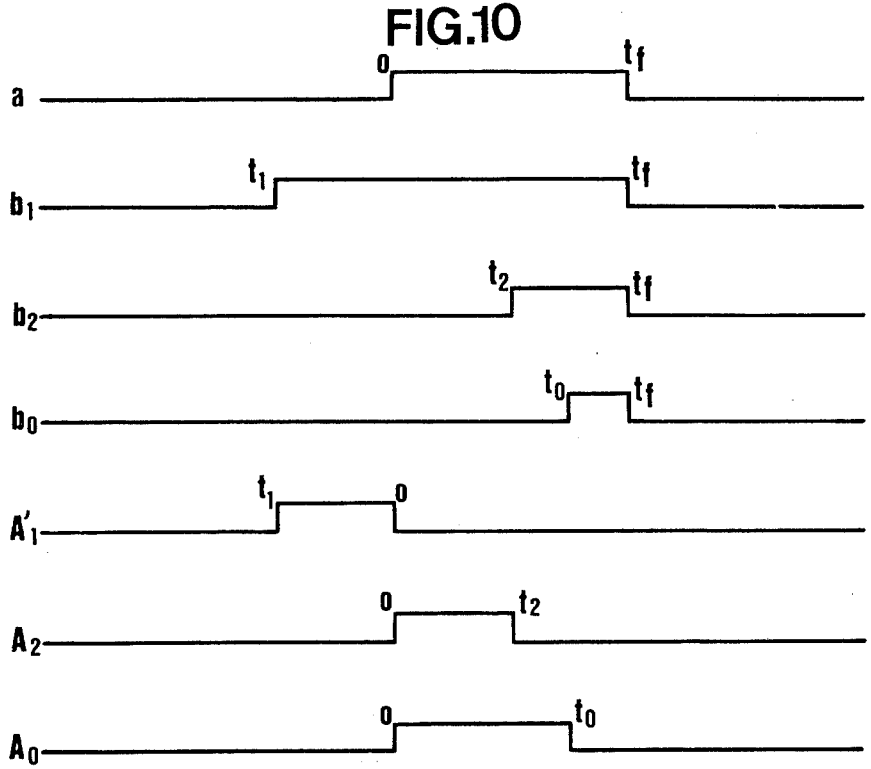
FIG. 10 is a time chart illustrating the processing performed by the circuit of FIG. 9.

The output signals $A'_1$, $A_o$ and $A_2$ of gates 41', 40 and 42 have been represented on the diagram of FIG. 10. As shown, these signals are rectangular signals of duration $t_1$, $t_o$ and $t_2$ respectively.

It is clear from the figure that if $t_1$ is negative, $A_1$ is always zero, and that if $t_2$ is positive, $A'_2$ is always zero.

The output signals of the AND gates are used to control the closing of switches 51, 51', 52, 52', 50 respectively.

The closing of switches 51 and 52 sets up of a voltage $+V$, and the closing of switches 51', 52' and 50 sets up a voltage $-V$.

The polarity of the applied voltage is bound to the sign of $t_1$ and $t_2$. It can be seen that if $t_1$ is negative, the voltage will be $-V$ (closing of switch 51') and conversely if $t_1$ is positive, the voltage will be $+V$ (closing of switch 51).

At the output of the switches, rectangular signals $T_o$, $T_1$, $T_2$ are therefore obtained, of duration equal respectively to $t_1$, $t_2$ and $t_o$ and with an amplitude of either $+V$ or $-V$ according to the sign of $t_1$, $t_2$ and $t_o$.

These signals are applied thereafter to operational amplifiers 60 and 64 making the required operations for the calculation of $x_2$ and $y_2$.

Resistors 61 and 62 are chosen equal, so that amplifier 60 delivers a signal equal to $$\frac{T_1 + T_2}{2}.$$

Resistors 65, 66, 67, 68 and 69 are chosen so that amplifier 64 transmits a signal equal to $$\frac{T_2 - T_1 - 2T_o}{2}$$

This result is reached simply by giving to the three resistors 65, 68 and 69 the same value R, to resistor 66 the value 4 R and to resistor 67 the value 2 R.

The values of the aforesaid resistors may be chosen freely, and it is only sufficient that they be far greater than the resistances of the aforesaid switches.

In order to obtain $x_2$ and $y_2$, there remains only the calculation of the average value of the output signals of amplifiers 60 and 64. This object is reached by means of low-pass filters 70 and 74 whose cut-off frequency is substantially inferior to the scanning frequency. Values resulting from this filtering are the averages out of a large number of scanning periods and represent in electrical form the required co-ordinates $x_2$ and $y_2$.

If the instantaneous values of $x_2$ and $y_2$ are to be obtained, that is, their values on a single scanning period (interval between two consecutive pulses $I_f$), it suffices to modify the described circuit by incorporating integrators between the switches and the amplifiers, in order to obtain the average values of $T_1$, $T_2$, $T_o$ on each period, to add a storing capacitor at the output of each amplifier and to suppress filters 70 and 74. The instantaneous values are used for instance when it is requested to record the path of the tracer.

Figure 11:
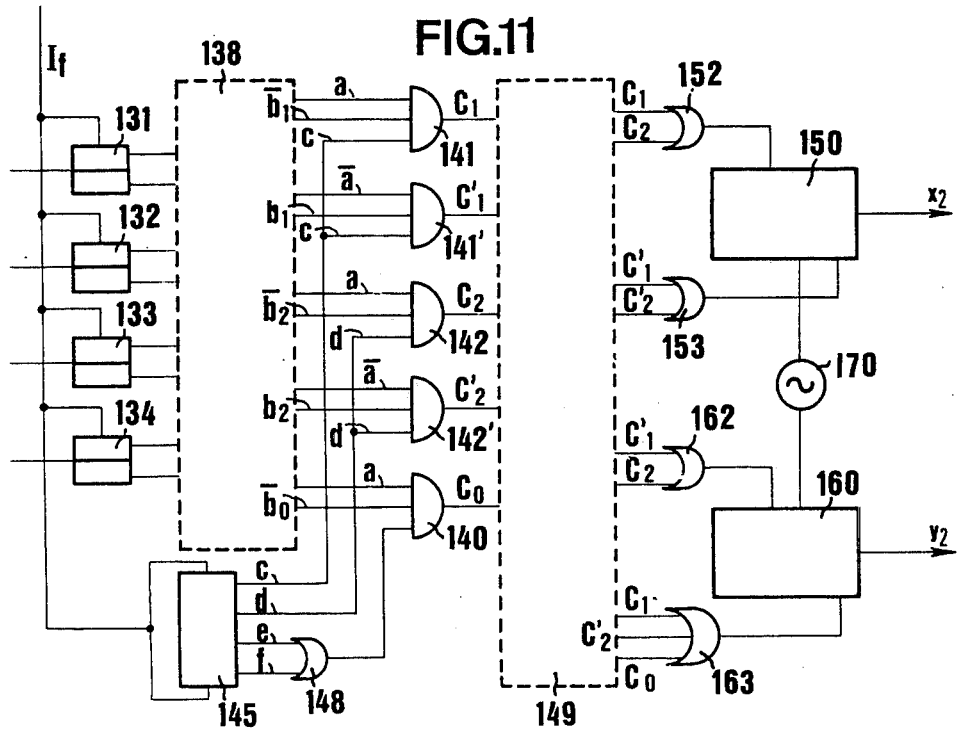
FIG. 11 is a digital processing circuit diagram for determining the co-ordinates of the tracer.

FIG. 11 shows another embodiment of the device 5 wherein values $x_2$ and $y_2$ are supplied in digital mode.

Figure 9:
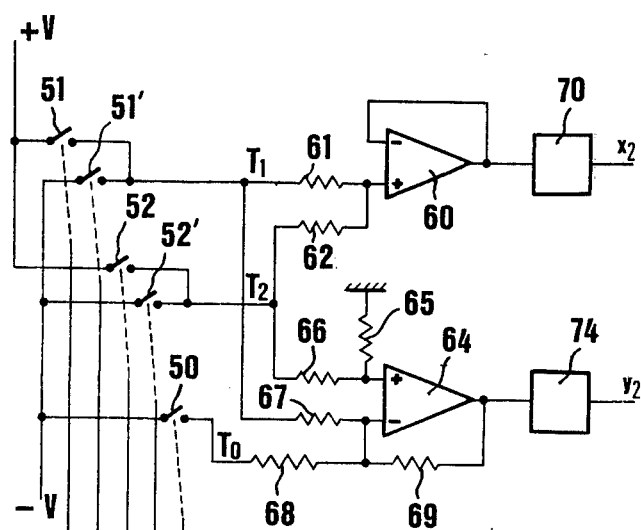
FIG. 9 is an analog processing circuit diagram for determining the co-ordinates of the tracer.
Figure 9:
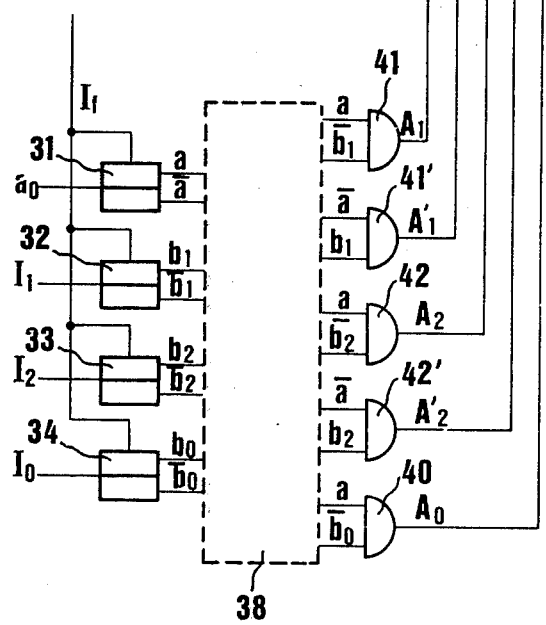
Figure 12:
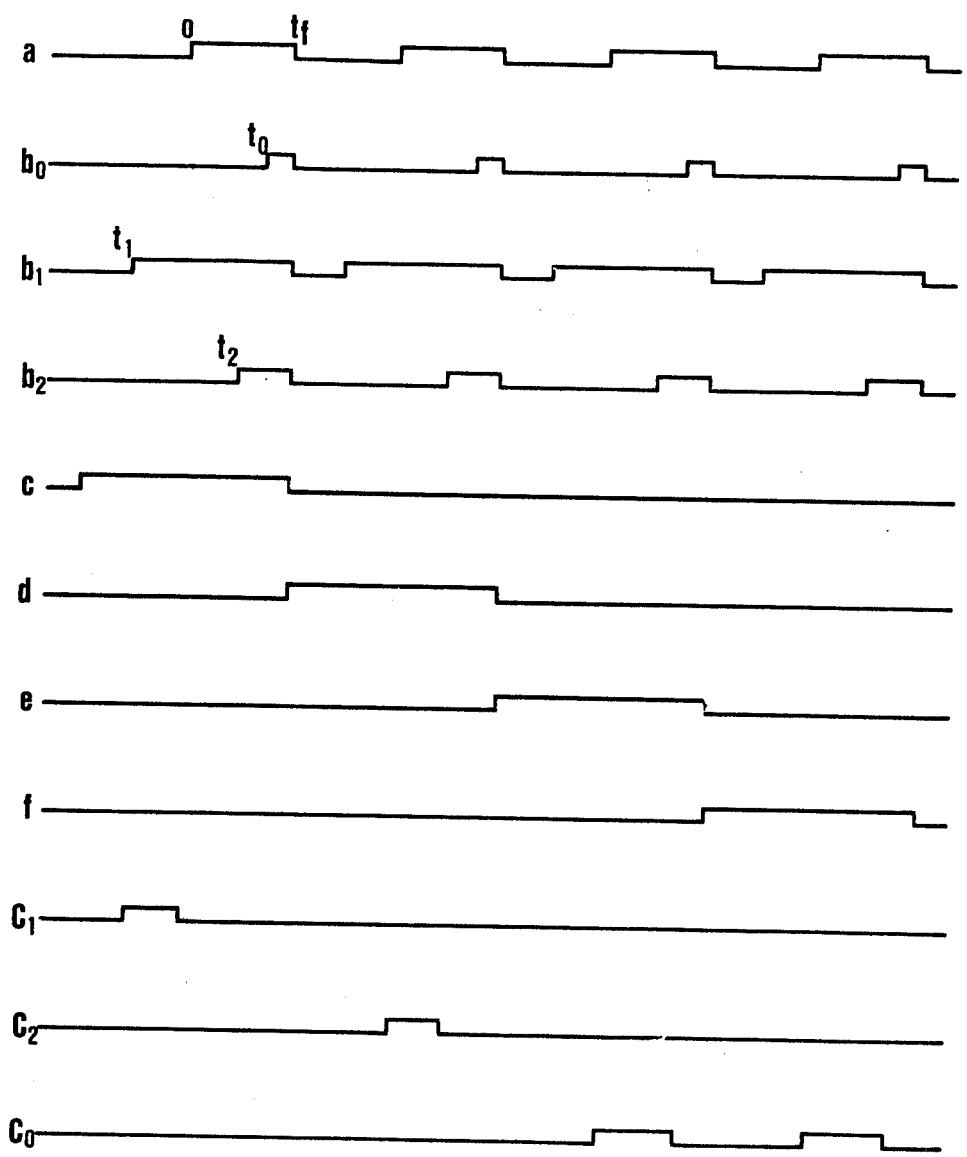
FIG. 12 is a time chart illustrating the processing performed by the circuit of FIG. 11.

The device comprises four flip-flops 131, 132, 133 and 134 arranged in the same manner as the input flip-flops of the analog device of FIG. 9. The output signals a, $b_o$, $b_1$, $b_2$ shown in FIG. 12 are the same as those of FIG. 10 but shown at a smaller scale for convenience.

These signals, and the associated signals, are applied through connections symbolized by block 138 to AND gates 141, 141', 142, 142', 140 in the manner shown in FIG. 11.

In addition to these signals, the aforesaid gates receive signals c, d, e or f coming from the ring counter 145 receiving pulse $I_f$. These signals, as shown in the chart of FIG. 12, are rectangular signals with a duration of one scanning period, shifted in relation to one another. The recurrence frequency of these signals is therefore one quarter of the scanning frequency.

The output signals of AND gates, that is $C_1$, $C'_1$, $C_2$, $C'_2$ and $C_o$, have therefore the shape shown on the chart. Signals $C'_1$ and $C_2$ corresponding to signals $A'_1$ and $A_2$ of the chart of FIG. 10 have a "crenel" only every fourth period, and signal $C_o$ has two consecutive "crenels" every fourth period due to the fact that gate 140 receives the signal transmitted by OR gate 148 to which are applied signals e and f.

The output signals of AND gates are applied, combined in appropriate manner by means of OR gates 152, 153 and 162, 163, to up-down counters 150 and 160 through connections symbolized by block 149.

The up-down counters 150 and 160 are connected respectively to an oscillator 170 transmitting clock impulses. These impulses are counted or deducted only if the up-down counter 150 (or 160) is authorized by the signals from the aforesaid OR gates.

Signals $C_1$, $C_2$ which, like signals $A_1$, $A_2$ of the chart of FIG. 10, have "crenels" only if $t_1$ or $t_2$ are respectively positive, are applied to the counting input 155 of counter 150. Conversely, signals $C'_1$, $C'_2$ which have "crenels" only if $t_1$ or $t_2$ are respectively negative, are applied to the deducting input 156.

Since $t_1$ is negative in the described embodiment, signal $C'_1$ authorizes deduction during the first scanning period (crenel of signal c). Of course $C_1$ is zero since $t_1$ is negative. During the second period (crenel of signal d), signal $C_2$ authorized counting.

Finally, the up-down counter 150 makes the algebrical addition $t_1 + t_2$, in other words supplies the co-ordinate $x_2$ in the form of a number of impulses, and this every four scanning periods.

The up-down counter 160 makes similarly the operation $t_2 - t_1 - 2t_o$ for the calculation of $y_2$. It receives $C'_1$ on its counting input 165 or $C_1$ on its deducting input 166, during the first scanning period. During the second period, it receives $C_2$ on its counting input, and $C'_2$ on its deducting input. Finally, during the third and fourth periods (crenels of signals e and f) it receives signal $C_o$ on its deducting input.

The up-down counters 150 and 160 thus supply co-ordinates $x_2$ and $y_2$ in digital form, which is of interest where a digital computer is to be utilized.

The signals representative of co-ordinates $x_2$, $y_2$ are applied to computer 6 as hereabove indicated, with a view to obtain the correction voltages (x, y).

Another embodiment of the thermal telescope is shown on FIG. 13, simplified in comparison to the embodiment of FIG. 2 in that the detecting device comprises a single mosaic array 11 of elementary detectors, for instance of $Cd_x Hg_{1-x} Te$, formed, as mosaic array 3 of FIG. 2, with a large number of elementary detectors, for instance fifty.

Figure 14:
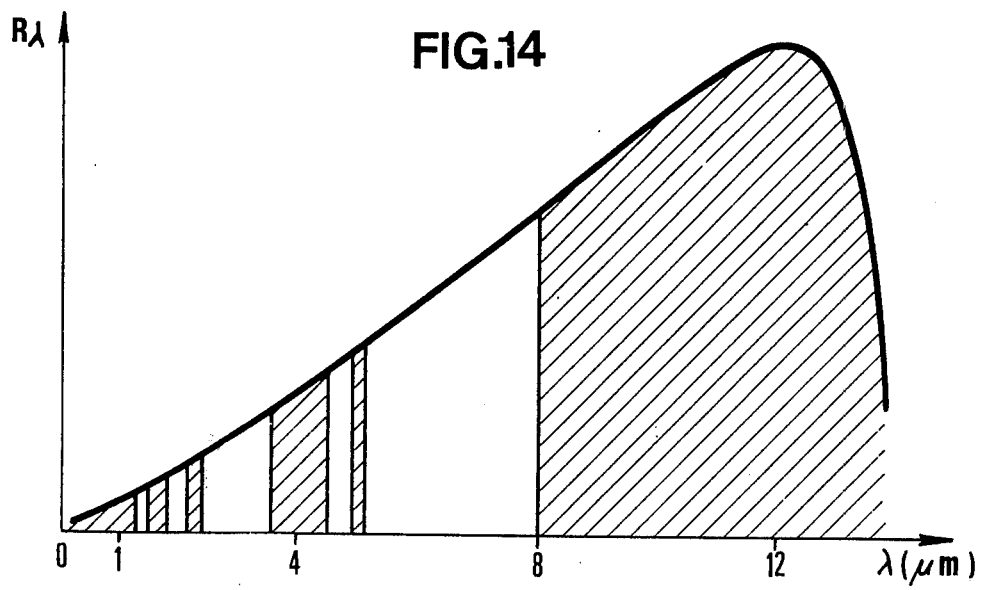
FIG. 14 shows the response of the detector used in the described embodiment, the atmospheric windows being hatched.

The response curve of detector 11 is shown in FIG. 14, and it may be seen that the sensitivity is maximum for a wave-length of about 12 μm, and that it decreases regularly as the wave-length decreases. This shape of the response curve is given only as an example, and it may also be possible to have a maximum sensitivity for another wave-length between 8 and 12 μm, simply by modifying the proportions of the detector components, that is the value of x. This feature of detector 11 has an advantage in that it allows detection in a very large spectral area. It is clear in particular that a detection remains possible within the atmospheric window around 4 μm, since the level is still of about 25% of the maximum level.

The telescope comprises a disc 12 carrying two filters 13 and 14 mounted in openings. The disc 12 is arranged eccentrically in relation to the optical axis of the telescope in such manner that, according to its angular position, either the filter 13 or the filter 14 is in the optical axis. The disc 12 is connected to an electrically actuated control device 20 owing to which the required filter is placed in the telescope optical axis.

Filter 13 is high-pass filter transparent to radiations of a wave-length exceeding 8 μm. The frequency band which it defines corresponds to the atmospheric window 8–12 μm.

Filter 14 is a low-pass filter defining a very narrow band of 3,8 to 4 μm, this band being within the atmospheric window around 4 μm.

Figure 15:
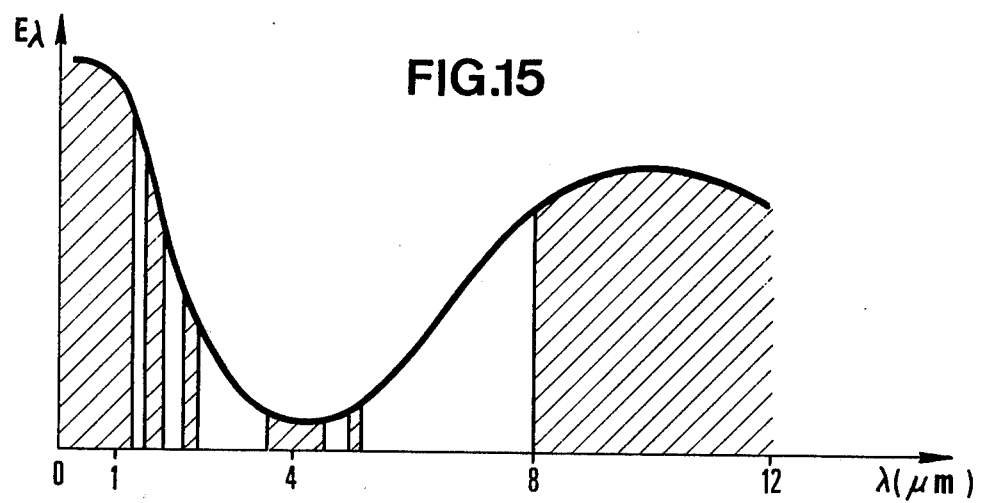
FIGS. 15 and 16 show the transmitting curves of the target and environing landscape, and the tracer, respectively, the atmospheric windows being also shown by the hatched areas.
Figure 16:
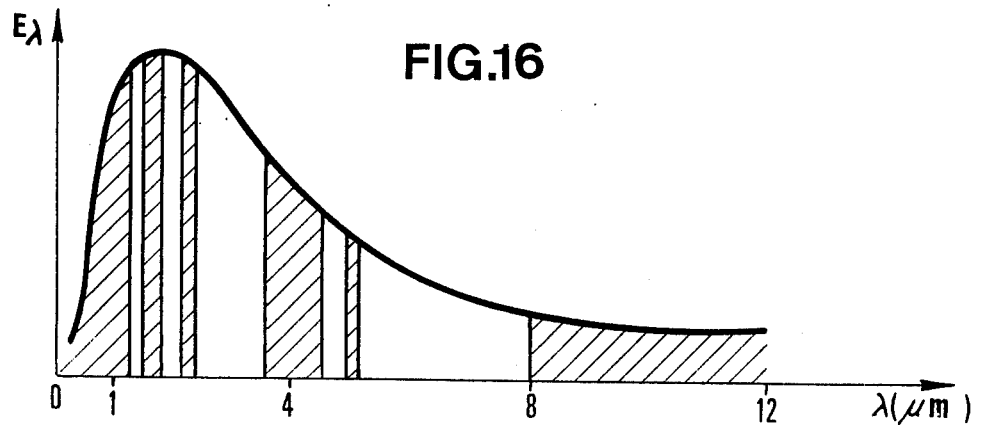

The transmitting curve of the target and landscape, shown in FIG. 15, and that of the pyrometric missile-borne tracer, shown in FIG. 16, make it clear that filter 13 is used for observing the target and its environment while filter 14 is used for observing the tracer.

As can be seen from FIG. 15, the transmitted radiation of the target and landscape is intense between 8 and 12 μm, but weak in the vicinity of 4 μm, and it can be seen from FIG. 16 that the transmitted radiation of the tracer is maximum around 1,6 μm, that it is still relatively high around 4μm, and that it decreases substantially in the wave-lengths superior to 8 μm.

As the band defined by filter 14 is very narrow and as the transmitted radiation of the target and landscape is weak in this wave-length area, a well contrasty image of the tracer will be obtained by using filter 14.

Detector 11 is placed in the telescope in such manner as to coincide with the focus of lens 1, for wave-lengths of 8 to 12 μm corresponding to filter 13.

In the described embodiment, the optics of the telescope schematized by lens 1 are not achromatic, meaning that its focal distance depends on the wave-length of the incoming radiation. In particular, the focal distance of a radiation of 3,8-4 μm wave-length is slightly inferior to the focal distance for a radiation of 8–12 μm wave-length. Detector 11 being placed in the focal plane corresponding to this wave-length area, that is corresponding to filter 13, a plate with parallel faces 15, for instance made of silicon, whose thickness is calculated in order to obtain focusing in the plane of detector 11, is associated with filter 14 to compensate for the focal distance difference. The mentioned thickness is in practice of 2 to 3 μm, the refraction index being of 3,4 for silicon. Advantageously, filter 14 is placed on plate 15 as shown in FIG. 1.

However, it should be noted that using plate 15 is possible only due to the fact that the frequency band defined by filter 14 is very narrow.

Of course, plate 15 becomes superfluous if achromatic optics are used for the instruments, which should therefore be made of mirrors.

The device according to FIG. 13 is identical for the remaining components as the device shown in FIG. 2.

In order to detect the missile, disc 12 is rotated so as to place filter 14 on the optical axis. This allows co-ordinates $x_2$ and $y_2$ of the missile to be determined in the co-ordinate system of the thermal telescope, corresponding to time $t_o$. These co-ordinates are transmitted to the device 5 identical to the device 5 shown in FIG. 2.

What I claim is:

1. A night guiding device for self-propelled missiles, comprising a daylight sighting telescope and an infrared goniometer, the unit being called a localizing apparatus, for detecting an infrared missile-borne source, or tracer, a night sighting thermal telescope, a visualization device associated therewith, further comprising a computer arranged for receiving through storing, amplifying and processing means, on the one hand signals transmitted by the localizing apparatus and characteristic of the missile position in relation to the optical axis of said localizing apparatus, and on the other hand signals supplied by the thermal telescope and characteristic of the missile position in relation to the optical axis of said thermal telescope, said computer supplying to said visualization device, signals representative of the difference between the signals received respectively from the localizing apparatus and the thermal telescope.

2. A device according to claim 1, wherein the visualizing device is a cathodic tube, the signals supplied to the computer being applied to the horizontal and vertical deflection plates or coils of the cathodic tube.

3. A device according to claim 1, wherein the thermal telescope, provided with a focusing lens and a scanning device along one direction, comprises a detecting device composed of two infrared detectors, the first one being sensitive to the transmitting spectral area of the target and landscape, and the second one being sensitive to the transmitting spectral area of the missile-borne tracer.

4. A device according to claim 3, wherein each of the detectors is made of a linear mosaic array of elementary detectors arranged transversely to the scanning direction, both mosaic arrays being placed in the focal plane of the thermal telescope.

5. A device according to claim 4, wherein the two detectors are placed side by side in the focal plane of the thermal telescope.

6. A device according to claim 4, wherein the two detectors are superimposed in the focal plane of the thermal telescope.

7. A device according to claim 4, wherein the spectral area of the second sensor is 1,5 to 2,5μ.

8. Device according to claim 4 wherein the second detector is of $Cd_xHg_{1-x}Te$, PbS or InAs.

9. A device according to claim 4, wherein the first detector has a spectral area between 3μ and 5μ.

10. A device according to claim 4, wherein the first detector has a spectral area between 8μ and 12μ.

11. A device according to claim 3, wherein said first detector is a linear mosaic array of elementary detectors arranged transversely to the scanning direction, and said second detector is made of two threadlike detectors non-parallel to the scanning direction and non-parallel with respect to each other.

12. A device according to claim 11, wherein if there is defined a reference system X'X, Y'Y with origin on the optical axis, the axis X'X being parallel to the scanning direction, the intersection points of the threadlike detectors with axis X'X are equidistant to the origin and the linear mosaic array is placed along axis Y'Y.

13. A device according to claim 11, wherein one at least of the threadlike detectors is inclined at 45° in relation to axis Y'Y.

14. A device according to claim 11, wherein, when a non achromatic focusing lens is used, the threadlike detectors are placed in a plane which is shifted in relation to the plane of the linear mosaic array in such manner that the plane of the threadlike detectors is in the focal plane of the lens within the sensitivity area of said detectors, and filters defining a narrow wave-length band are placed in front of said detectors.

15. A device according to claim 11, comprising, for obtaining signals characteristic of co-ordinates $x_2$, $y_2$ of the tracer in said reference system, means connected to the scanning device for generating a pulse defining an time origin, impulse at the end of one scanning period, and a reference pulse bound to the arrangement of the detectors, means for generating from said pulses and from the pulses delivered by the detectors, rectangular signals associated respectively with said reference pulse and with the pulses transmitted by the detectors, the duration of the crenels being equal to the intervals separating the pulse in question from the time origin pulse, means for converting said rectangular signals into respective rectangular signals whose crenels have the same length but are positive or negative depending on whether the considered pulse is subsequent or prior to the time origin, means for combining the signals thus derived for the calculation of the coordinates $x_2$ and $y_2$, and means for calculating the average value of the combinations thus obtained.

16. A device according to claim 11, comprising, for obtaining signals characteristic of co-ordinates $x_2$, $y_2$ of the tracer in said reference system, means connected to the scanning device for generating a pulse defining a time origin, and a pulse at the end of a scanning period, and a reference pulse bound to the arrangement of the detectors, means for generating from said pulses and from the pulses delivered by the detectors rectangular signals associated respectively with said reference pulse and with the pulses delivered by the sensors, the duration of their crenels being equal to the intervals between the pulse in question and the time origin pulse, said crenels being located each on a different scanning period, two up-down counters for the calculation of co-ordinates $x_2$, $y_2$ respectively, and means associated to each updown counter for combining said rectangular signals and applying them to said up-down counters for calculation of co-ordinates $x_2$, $y_2$.

17. A device according to claim 1, wherein the thermal telescope comprises a single infrared detector particularly sensitive in the transmitting spectral area of the target and landscape, but with a sensitivity in the transmitting spectral area of the tracer sufficient for the detection thereof, a first optical filter defining a wide wave-length band for the detection of the target and landscape, a second optical filter defining a very narrow band for the detection of the tracer, and a selection member for placing either the first filter or the second filter on the telescope optical axis.

18. A device according to claim 17, wherein the first filter is transparent to radiations from 8 to 12 $\mu$m wavelengths, and the second filter is transparent only to radiations from 3,8 to 4 $\mu$m, or from 4 to 4,3 $\mu$m wavelengths.

19. A device according to claim 17, wherein, if the optics of the thermal telescope are not achromatic, said second filter is associated with plate with parallel faces arranged in such manner that for a narrow wave-length band corresponding to said second filter, the focus of the optical system of the telescope is in the plane of the detector.

20. A device according to claim 19, wherein said second filter is mounted on the plate with parallel faces.

* * * * *